US009565448B2

United States Patent
Kim et al.

(10) Patent No.: US 9,565,448 B2
(45) Date of Patent: *Feb. 7, 2017

(54) IMAGE CODING METHOD AND APPARATUS USING SPATIAL PREDICTIVE CODING OF CHROMINANCE AND IMAGE DECODING METHOD AND APPARATUS

(71) Applicant: SAMSUNG ELECTRONICS CO., LTD., Suwon-si, Gyeonggi-do (KR)

(72) Inventors: Woo-shik Kim, Kyugki-do (KR); Chang-yeong Kim, Kyungki-do (KR); Yang-seock Seo, Kyungki-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/003,275

(22) Filed: Jan. 21, 2016

(65) Prior Publication Data

US 2016/0142734 A1    May 19, 2016

Related U.S. Application Data

(60) Continuation of application No. 14/456,388, filed on Aug. 11, 2014, now Pat. No. 9,282,341, which is a
(Continued)

(30) Foreign Application Priority Data

Sep. 30, 2002  (KR) .................. 10-2002-0059468
Aug. 12, 2003  (KR) .................. 10-2003-0055887

(51) Int. Cl.
*G06K 9/36*     (2006.01)
*G06K 9/46*     (2006.01)
(Continued)

(52) U.S. Cl.
CPC ............ *H04N 19/593* (2014.11); *G06T 9/004* (2013.01); *G06T 9/005* (2013.01); *H04N 19/11* (2014.11);
(Continued)

(58) Field of Classification Search
CPC ....... G06T 9/004; G06T 9/005; H04N 19/176; H04N 19/186; H04N 19/593; H04N 19/11; H04N 19/14; H04N 19/61
(Continued)

(56) References Cited

U.S. PATENT DOCUMENTS 5,737,022 A    4/1998   Yamaguchi et al.
5,784,572 A    7/1998   Rostoker et al.
(Continued)

OTHER PUBLICATIONS

Restriction Requirement Office Action mailed Feb. 20, 2007 in parent U.S. Appl. No. 10/673,186 (5 pages).
(Continued)

*Primary Examiner* — Samir Ahmed
(74) *Attorney, Agent, or Firm* — Staas & Halsey LLP

(57) ABSTRACT

A coding method including dividing pixels of a chrominance component of an input image into blocks having a predetermined size; selecting one among a direct current prediction method, a vertical prediction method, a horizontal prediction method, and a hybrid prediction method according to a user's input; generating a prediction value of each pixel in a current block to be predictively coded, using at least one pixel value among pixel values in an upper reference block adjacent to the current block and in a side reference block adjacent to the current block, according to the selected prediction method; generating a differential value between the prediction value and a corresponding real pixel value in the current block; and coding the differential
(Continued)

value and information on the selected prediction method using a predetermined coding method.

4 Claims, 14 Drawing Sheets

Related U.S. Application Data continuation of application No. 13/673,331, filed on Nov. 9, 2012, now abandoned, which is a division of application No. 11/882,869, filed on Aug. 6, 2007, now Pat. No. 8,345,995, which is a division of application No. 10/673,186, filed on Sep. 30, 2003, now Pat. No. 7,266,247.

(51) Int. Cl.
*H04N 19/593* (2014.01)
*G06T 9/00* (2006.01)
*H04N 19/176* (2014.01)
*H04N 19/61* (2014.01)
*H04N 19/11* (2014.01)
*H04N 19/14* (2014.01)
*H04N 19/186* (2014.01)
*H04N 19/44* (2014.01)

(52) U.S. Cl.
CPC ............ *H04N 19/14* (2014.11); *H04N 19/176* (2014.11); *H04N 19/186* (2014.11); *H04N 19/44* (2014.11); *H04N 19/61* (2014.11)

(58) Field of Classification Search
USPC ................................................ 382/236, 238
See application file for complete search history.

(56) References Cited

U.S. PATENT DOCUMENTS

| | | | |
|---|---|---|---|
| 5,974,184 A | 10/1999 | Eifrig et al. | |
| 5,987,184 A | 11/1999 | Kweon et al. | |
| 6,148,109 A | 11/2000 | Boon et al. | |
| 6,157,676 A | 12/2000 | Takaoka et al. | |
| 6,173,080 B1 | 1/2001 | Cho et al. | |
| 6,198,768 B1 | 3/2001 | Yamaguchi et al. | |
| 6,272,178 B1 | 8/2001 | Nieweglowski et al. | |
| 6,275,533 B1 | 8/2001 | Nishi | |
| 6,532,306 B1 | 3/2003 | Boon et al. | |
| 6,546,141 B1 | 4/2003 | Jung et al. | |
| 6,785,425 B1 | 8/2004 | Feder et al. | |
| 6,842,768 B1 | 1/2005 | Shaffer et al. | |
| 6,938,073 B1 | 8/2005 | Mendhekar et al. | |
| 6,980,596 B2 | 12/2005 | Wang et al. | |
| 7,116,830 B2 | 10/2006 | Srinivasan | |
| 7,272,298 B1 | 9/2007 | Lang et al. | |
| 8,331,450 B2 | 12/2012 | Sun et al. | |
| 8,345,995 B2 | 1/2013 | Kim | |
| 9,282,341 B2 * | 3/2016 | Kim | ........................ G06T 9/004 |
| 2001/0002204 A1 | 5/2001 | Jebens et al. | |
| 2003/0138150 A1 | 7/2003 | Srinivasan | |
| 2004/0028282 A1 | 2/2004 | Kato et al. | |

OTHER PUBLICATIONS

Notice of Allowance mailed May 3, 2007 in parent U.S. Appl. No. 10/673,186 (8 pages).
Restriction Requirement Office Action mailed Feb. 17, 2012 in corresponding U.S. Appl. No. 11/882,869 (5 pages).
Non-Final Office Action mailed Mar. 23, 2012 in corresponding U.S. Appl. No. 11/882,869 (10 pages).
Notice of Allowance mailed Aug. 9, 2012 in corresponding U.S. Appl. No. 11/882,869 (8 pages).
Non-Final Office Action dated Jun. 10, 2013 in corresponding U.S. Appl. No. 13/673,331 (17 pages).
Final Office Action dated Oct. 22, 2014 in corresponding U.S. Appl. No. 13/673,331 (12 pages).
Non-Final Office Action dated Apr. 23, 2015 in corresponding U.S. Appl. No. 14/456,388 (20 pages).
Final Office Action dated Oct. 1, 2015 in corresponding U.S. Appl. No. 14/456,388 (12 pages).
Notice of Allowance mailed Jan. 20, 2016 in corresponding U.S. Appl. No. 14/456,388 (5 pages).
U.S. Appl. No. 14/456,388, filed Aug. 11, 2014, Woo-shik Kim et al.
U.S. Appl. No. 13/673,331, filed Nov. 9, 2012, Woo-shik Kim et al.
U.S. Appl. No. 11/882,869, filed Aug. 6, 2007, Woo-shik Kim et al.
U.S. Appl. No. 10/673,186, filed Sep. 30, 2003, Woo-shik Kim et al.

* cited by examiner

FIG. 1A (PRIOR ART)

|     | $q_{10}$ | $q_{20}$ | $q_{30}$ | $q_{40}$ | $q_{50}$ | $q_{60}$ | $q_{70}$ | $q_{80}$ |
|-----|----------|----------|----------|----------|----------|----------|----------|----------|
| $q_{01}$ | $q_{11}$ | $q_{21}$ | $q_{31}$ | $q_{41}$ | $q_{51}$ | $q_{61}$ | $q_{71}$ | $q_{81}$ |
| $q_{02}$ | $q_{12}$ | $q_{22}$ | $q_{32}$ | $q_{42}$ | $q_{52}$ | $q_{62}$ | $q_{72}$ | $q_{82}$ |
| $q_{03}$ | $q_{13}$ | $q_{23}$ | $q_{33}$ | $q_{43}$ | $q_{53}$ | $q_{63}$ | $q_{73}$ | $q_{83}$ |
| $q_{04}$ | $q_{14}$ | $q_{24}$ | $q_{34}$ | $q_{44}$ | $q_{54}$ | $q_{64}$ | $q_{74}$ | $q_{84}$ |
| $q_{05}$ | $q_{15}$ | $q_{25}$ | $q_{35}$ | $q_{45}$ | $q_{55}$ | $q_{65}$ | $q_{75}$ | $q_{85}$ |
| $q_{06}$ | $q_{16}$ | $q_{26}$ | $q_{36}$ | $q_{46}$ | $q_{56}$ | $q_{66}$ | $q_{76}$ | $q_{86}$ |
| $q_{07}$ | $q_{17}$ | $q_{27}$ | $q_{37}$ | $q_{47}$ | $q_{57}$ | $q_{67}$ | $q_{77}$ | $q_{87}$ |
| $q_{08}$ | $q_{18}$ | $q_{28}$ | $q_{38}$ | $q_{48}$ | $q_{58}$ | $q_{68}$ | $q_{78}$ | $q_{88}$ |

FIG. 1B (PRIOR ART)

|    | S0 | S1 |
|----|----|----|
| S2 | A  | B  |
| S3 | C  | D  |

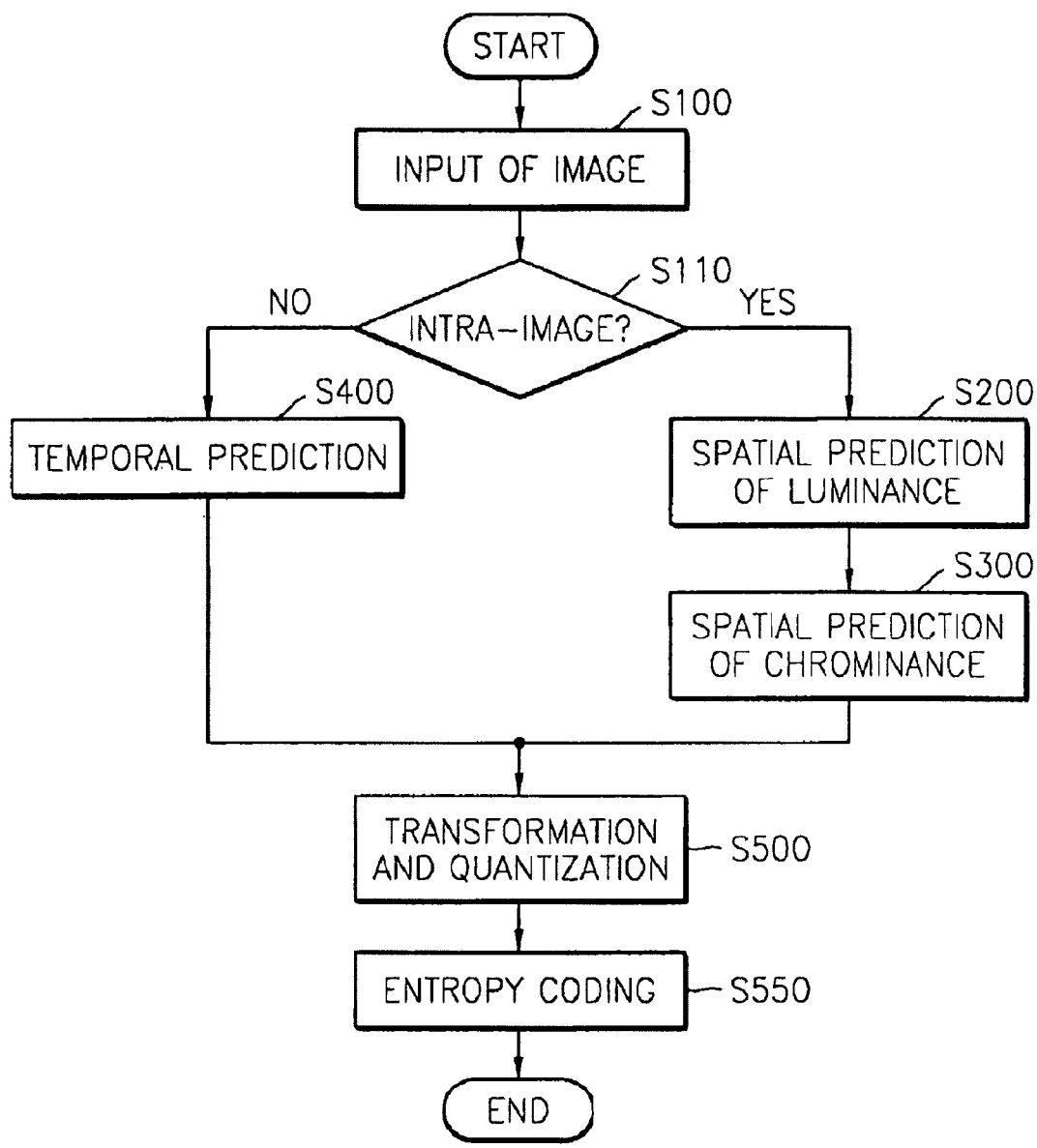

IMAGE CODING METHOD AND APPARATUS USING SPATIAL PREDICTIVE CODING OF CHROMINANCE AND IMAGE DECODING METHOD AND APPARATUS

CROSS-REFERENCE TO RELATED APPLICATIONS

This application is a continuation of U.S. application Ser. No. 14/456,388, filed Aug. 11, 2014, which is a continuation of U.S. application Ser. No. 13/673,331, filed Nov. 9, 2012, which is a divisional of U.S. application Ser. No. 11/882,869, filed on Aug. 6, 2007, which issued as U.S. Pat. No. 8,345,995 on Jan. 1, 2013, which is a divisional of U.S. application Ser. No. 10/673,186, filed Sep. 30, 2003, which issued as U.S. Pat. No. 7,266,247 on Sep. 4, 2007, which claims the priority of Korean Patent Application No. 10-2002-59468, filed on Sep. 30, 2002, and Korean Patent Application No. 10-2003-55887, filed on Aug. 12, 2003, in the Korean Intellectual Property Office, the disclosures of which are incorporated herein by reference.

BACKGROUND

1. Field

The present invention relates to image coding and decoding, and more particularly, to a method and apparatus for coding a chrominance component of an intra-image using spatial predictive coding and a method and apparatus for decoding the coded chrominance component.

2. Description of the Related Art

When an image or a motion image is compressed, the image is usually divided into a luminance component and a chrominance component, which are coded. The luminance component and the chrominance component have different statistical characteristics. Since human eyes are more sensitive to a change in the luminance component than to a change in the chrominance component, a sampling frequency for the luminance component is usually two or four times higher than that for the chrominance component. Pixel values of the chrominance component have a less variance than pixel values of the luminance component.

In conventional international standard technology for compressing a motion image, a single image is divided into a chrominance component and a luminance component and then coded. The image is coded without referring to another image. The coded image is referred to when images temporally following the coded image are predictively coded using motion estimation and compensation. The image coded without referring to another image is referred to as an intra-image, and the image coded using motion estimation and compensation referring to another image is referred to as an inter-image. The intra-image and the inter-image are lossy compressed through discrete cosine transformation (DCT), quantization, and entropy coding. Here, since temporal prediction is not used for the intra-image, spatial prediction is used for the intra-image to increase compression efficiency.

In motion image compression technology according to International Organization for Standardization/International Electrotechnical Commission (ISO/IEC) Motion Picture Experts Group (MPEG)-4 and International Telecommunication Union-Telecommunication Standardization (ITU-T) H.263+, when a spatial prediction is performed on the intra-image, an 8×8 pixel block is defined, and DCT and quantization are performed on each block. Next, direct current (DC) values and alternating current (AC) values of a current block are predictively coded referring to DC values and AC values of adjacent blocks to increase compression efficiency.

Recently, ISO/IEC MPEG and ITU-T Video Coding Experts Group (VCEG) organized a joint video team (JVT) to develop a new video coding standard. The final recommendation of the JVT committee includes technology for compressing an intra-image using spatial predictive coding. In this technology, a block size and a spatial prediction method used for a luminance component are different from those used for a chrominance component. A block of 4×4 or 16×16 is used for the luminance component. When a 4×4 block is used, 9 prediction methods are used according to a prediction direction. When a 16×16 block is used, 4 prediction methods are used according to a prediction direction.

Similarly to prediction using a 16×16 block for the luminance component, prediction for the chrominance component uses 4 prediction methods in which a block has a size of 8×8. In FIG. 1A, "q" denotes a value of each pixel in a current block of 8×8 to be coded or a value of a pixel in a block adjacent to the current block. A pixel value in the adjacent block is used to predict a pixel value in the current block. Specifically, a DC prediction method, a vertical prediction method, a horizontal prediction method, and a plane prediction method are used. In each prediction method, before pixel values in the current block are being coded, values of the respective pixels in the current block are predicted referring to values of pixels at the edges in adjacent blocks. The edges of the adjacent blocks respectively meet the left and the top of the current block. Next, a differential value between a predicted value, i.e., a prediction value of each pixel in the current block and a corresponding real pixel value in the current block is coded.

The DC prediction method uses an average of pixel values referred to. Referring to FIG. 1B, S0 denotes an average of pixel values $q_{10}$, $q_{20}$, $q_{30}$, and $q_{40}$. S1 denotes an average of pixel values $q_{50}$, $q_{60}$, $q_{70}$, and $q_{80}$. S2 denotes an average of pixel values $q_{01}$, $q_{02}$, $q_{03}$, and $q_{04}$. S3 denotes an average of pixel values $q_{05}$, $q_{06}$, $q_{07}$, and $q_{08}$. A pixel value in a block A of 4×4 is predicted using the averages S0 and S2. If only one of the averages S0 and S2 can be referred to, prediction is performed using the average S0 or S2 that can be referred to. If neither of the averages S0 and S2 can be referred to, a value of 128 is used for prediction. A pixel value in a block B of 4×4 is predicted using the average S1. If the average S1 cannot be referred to, the average S2 is referred to. If even the average S2 cannot be referred to, a value of 128 is used for prediction. A pixel value in a block C of 4×4 is predicted using the average S3. If the average S3 cannot be referred to, the average S0 is referred to. If even the average S0 cannot be referred to, a value of 128 is used for prediction. A pixel value in a block D of 4×4 is predicted using the averages S1 and S3. If only one of the averages S1 and S3 can be referred to, prediction is performed using the average S1 or S3 that can be referred to. If neither of the averages S1 and S3 can be referred to, a value of 128 is used for prediction.

In performing predictive coding, a differential value "$p_{xy}'$" obtained by subtracting a prediction value "pred" generated using a pixel value in an adjacent block from a corresponding pixel value "$p_{xy}$" in a current block to be coded is coded. For example, when all of the averages S0 through S3 can be used, the differential value "$p_{xy}'$" to be coded using frequency transformation and quantization and the prediction value "pred" depending on a coordinate value of the pixel are defined by Formula (1).

$$p_{xy}' = p_{xy} - \text{pred},$$

$$\text{pred} = (S0 + S2)/2, \quad 1 \leq x, y \leq 4,$$

$$pred = S1, 5 \leq x \leq 8, 1 \leq y \leq 4,$$

$$pred = S3, 1 \leq x \leq 4, 5 \leq y \leq 8,$$

$$pred = (S1+S3)/2, 5 \leq x, y \leq 8 \quad (1)$$

Meanwhile, in the vertical prediction method, predictive coding is performed in a vertical direction using a value of a pixel above a current block. In other words, pixels on the same column have the same prediction value $q_{x0}$, and a differential value to be coded is generated using Formula (2).

$$p_{xy}' = p_{xy} - q_{x0}, 1 \leq x, y \leq 8 \quad (2)$$

In the horizontal prediction method, predictive coding is performed in a horizontal direction using a value of a pixel on the left of a current block. In other words, pixels on the same row have the same prediction value $q_{0y}$, and a differential value to be coded is generated using Formula (3).

$$p_{xy}' = p_{xy} - q_{0y}, 1 \leq x, y \leq 8 \quad (3)$$

In the plane prediction method, a vertical variation and a horizontal variation are obtained using pixel values referred to, and pixel values in a current block are predicted according to a plane equation using the vertical and horizontal variations and the pixel values referred to. In other words, when a prediction value for a pixel value "$p_{xy}$" in a current block is denoted by "$pred_{xy}$", the prediction value "$pred_{xy}$" and a differential value "$p_{xy}$" are generated using Formula (4).

$$p_{xy}' = p_{xy} - pred_{xy}', \quad (4)$$
$$pred_{xy} = (a + b \times (x - 3) + c \times (y - 3))/32,$$
$$a = 16 \times (q_{80} + q_{08}),$$
$$b = (17 \times dH)/32,$$
$$c = (17 \times dV)/32,$$
$$dH = \sum_{x'=1}^{4} x' \times (q_{4+x',0} - q_{4-x',0})$$
$$dV = \sum_{y'=1}^{4} y' \times (q_{0,4+y'} - q_{0,4-y'})$$

Here, dH and dV denote the horizontal variation and the vertical variation, respectively.

The plane prediction method is disadvantageous in that a large amount of calculation is required because the vertical and horizontal variations need to be calculated and a prediction value of each pixel needs to be calculated using the plane equation.

In order to indicate which of the four prediction methods has been used during coding, entropy coding is performed using a variable-length code so that compensation during decoding is performed using the prediction method used during coding.

SUMMARY

The present invention provides a coding and decoding method for performing effective prediction with a small amount of calculation taking account of a statistical characteristic of a chrominance component when performing spatial predictive coding of the chrominance component in an intra-image, and an apparatus therefor.

The present invention also provides a recording medium for storing a program code for executing the above-described coding and decoding method in a computer.

According to an aspect of the present invention, there is provided a coding apparatus including a variation calculator, which calculates a vertical variation and a horizontal variation with respect to a current block to be predictively coded among blocks having a predetermined size, into which a chrominance component of an input image is divided, using pixel values in an upper reference block adjacent to the current block and pixel values in a side reference block adjacent to the current block; a hybrid predictor, which divides the current block into a predetermined number of regions according to the vertical and horizontal variations and generates a prediction value of each pixel in each region using a pixel value in the upper reference block or a pixel value in the side reference block; a differential value generator, which generates a differential value between the prediction value and a corresponding real pixel value in the current block and codes the differential value using a predetermined coding method.

According to another aspect of the present invention, there is provided a coding apparatus including a hybrid predictor, which divides a current block to be predictively coded among blocks having a predetermined size, into which a chrominance component of an input image is divided, into a predetermined number of regions according to a predetermined number of prediction methods and generates prediction values of each pixel in the current block according to the respective prediction methods using a pixel value in an upper reference block adjacent to the current block and a pixel value in a side reference block adjacent to the current block; a differential value generator, which generates differential values between the prediction values corresponding to the respective prediction methods and a corresponding real pixel value in the current block; a selector, which selects a differential value requiring a least number of bits for coding among the differential values; and a coder, which codes the selected differential value and information on a prediction method corresponding to the selected differential value using a predetermined coding method.

According to still another aspect of the present invention, there is provided a coding apparatus including a selector, which selects one among predetermined prediction methods comprising a direct current prediction method, a vertical prediction method, a horizontal prediction method, and a hybrid prediction method according to a user's input; a predictor, which generates a prediction value of each pixel in a current block to be predictively coded among blocks having a predetermined size, into which a chrominance component of an input image is divided, using at least one pixel value among pixel values in an upper reference block above the current block and in a side reference block on left of the current block, according to the selected prediction method; a differential value generator, which generates a differential value between the prediction value and a corresponding real pixel value in the current block; and a coder, which codes the differential value and information on the selected prediction method using a predetermined coding method.

Preferably, the predictor includes a hybrid predictor, and the hybrid predictor calculates a vertical variation and a horizontal variation with respect to the current block using pixel values adjacent to the current block in the upper and side reference blocks, divides the current block into a predetermined number of regions according to the vertical and horizontal variations, and generates prediction values of respective pixels in each region using the pixel values in the upper and side reference blocks.

According to still another aspect of the present invention, there is provided an apparatus for decoding a bitstream resulting from coding a chrominance component of an image to restore the image. The apparatus includes a decoder, which decodes each differential value for the chrominance component included in the bitstream in units of blocks using a predetermined decoding method corresponding to coding information read from the bitstream; a prediction method determiner, which determines whether a prediction mode indicating information on a prediction method is included in the bitstream, extracts the prediction mode from the bitstream when the prediction mode is determined as being included in the bitstream, determines the prediction method based on the extracted prediction mode, calculates a vertical variation and a horizontal variation with respect to a current block to be restored using pixel values in an upper reference block and a side reference block, which have been restored prior to the current block, when the prediction mode is determined as not being included in the bitstream, and determines the prediction method according to the vertical and horizontal variations; a prediction value generator, which generates a prediction value of each pixel in the current block according to the determined prediction method; and a predictive compensator, which adds the prediction value to a corresponding differential value to restore the chrominance component of the image.

Preferably, when the prediction method is determined according to the vertical and horizontal variations, the prediction value generator compares the vertical variation with the horizontal variation, divides the current block into a plurality of regions in a predetermined direction according to the result of comparison, and generates prediction values of respective pixels in each region using pixel values in the upper and side reference blocks.

According to still another aspect of the present invention, there is provided a coding method including dividing pixels of a chrominance component of an input image into blocks having a predetermined size; generating a vertical variation and a horizontal variation with respect to a current block to be predictively coded, using pixel values in an upper reference block adjacent to the current block and pixel values in a side reference block adjacent to the current block; dividing the current block into a predetermined number of regions according to the vertical and horizontal variations and generating a prediction value of each pixel in each region using a pixel value in the upper reference block or a pixel value in the side reference block; and generating a differential value between the prediction value and a corresponding real pixel value in the current block and coding the differential value using a predetermined coding method.

According to still another aspect of the present invention, there is provided a coding method including dividing pixels of a chrominance component of an input image into blocks having a predetermined size; dividing a current block to be predictively coded into a predetermined number of regions according to a predetermined number of prediction methods and generating prediction values of each pixel in the current block according to the respective prediction methods using a pixel value in an upper reference block adjacent to the current block and a pixel value in a side reference block adjacent to the current block; generating differential values between the prediction values corresponding to the respective prediction methods and a corresponding real pixel value in the current block; and selecting a differential value requiring a least number of bits for coding among the differential values and coding the selected differential value and information on a prediction method corresponding to the selected differential value using a predetermined coding method.

According to still another aspect of the present invention, there is provided a coding method including dividing pixels of a chrominance component of an input image into blocks having a predetermined size; selecting one among a direct current prediction method, a vertical prediction method, a horizontal prediction method, and a hybrid prediction method according to a user's input; generating a prediction value of each pixel in a current block to be predictively coded, using at least one pixel value among pixel values in an upper reference block adjacent to the current block and in a side reference block adjacent to the current block, according to the selected prediction method; generating a differential value between the prediction value and a corresponding real pixel value in the current block; and coding the differential value and information on the selected prediction method using a predetermined coding method.

Preferably, the hybrid prediction method includes calculating a vertical variation and a horizontal variation with respect to the current block using pixel values adjacent to the current block in the upper and side reference blocks, dividing the current block into a predetermined number of regions according to the vertical and horizontal variations, and generating prediction values of respective pixels in each region using the pixel values in the upper and side reference blocks.

According to still another aspect of the present invention, there is provided a method of decoding a bitstream resulting from coding a chrominance component of an image to restore the image. The method includes (a) decoding each differential value for the chrominance component included in the bitstream in units of blocks using a predetermined decoding method corresponding to coding information read from the bitstream; (b) determining whether a prediction mode indicating information on a prediction method is included in the bitstream, extracting the prediction mode from the bitstream, and determining the prediction method based on the extracted prediction mode; (c) when it is determined that the prediction mode is not included in the bitstream, calculating a vertical variation and a horizontal variation with respect to a current block to be restored using pixel values in an upper reference block and a side reference block, which have been restored prior to the current block, and determining the prediction method according to the vertical and horizontal variations; (d) generating a prediction value of each pixel in the current block according to the prediction method determined in step (b) or (c); and (e) adding the prediction value to a corresponding differential value to restore the chrominance component of the image.

Preferably, the prediction method determined in step (c) includes comparing the vertical variation with the horizontal variation, dividing the current block into a plurality of regions in a predetermined direction according to the result of comparison, and generating prediction values of respective pixels in each region using pixel values in the upper and side reference blocks.

BRIEF DESCRIPTION OF THE DRAWINGS

The above and other features and advantages of the present invention will become more apparent by describing in detail preferred embodiments thereof with reference to the attached drawings in which:

FIGS. 1A and 1B illustrate a conventional spatial prediction method for a chrominance component;

FIG. 2B is a flowchart of an image coding method according to an embodiment of the present invention;

DESCRIPTION OF EMBODIMENTS

Hereinafter, an image coding and decoding apparatus and method according to preferred embodiments of the present invention will be described in detail with reference to the attached drawings.

Figure 2A:
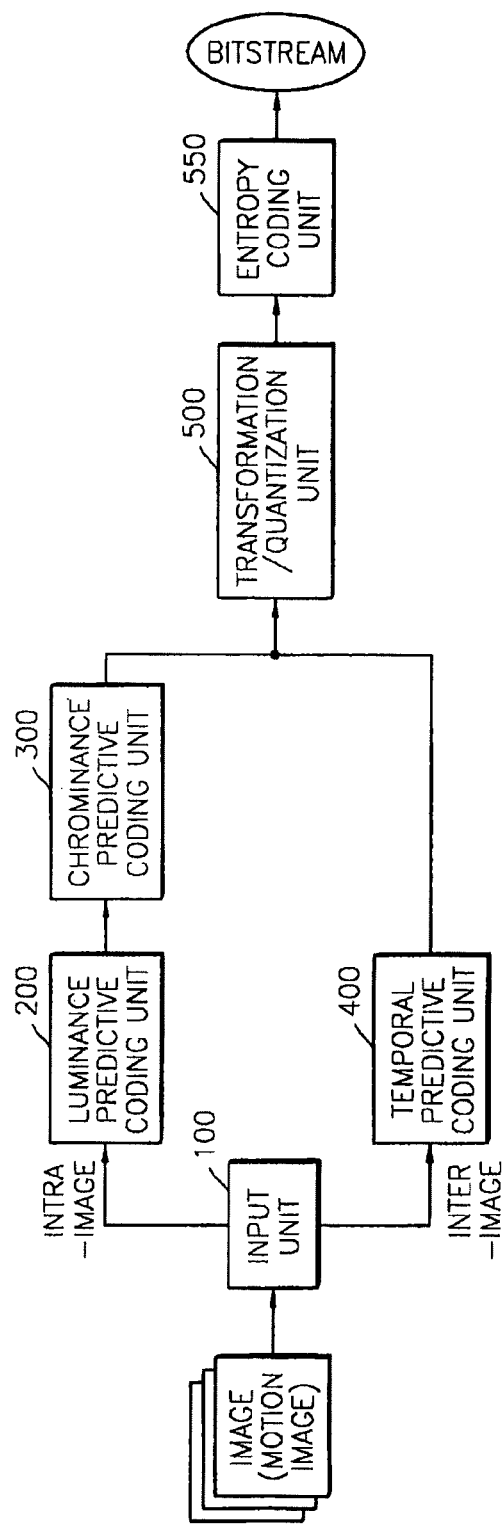
FIG. 2A is a block diagram of an image coding apparatus according to an embodiment of the present invention.

FIG. 2A is a block diagram of a coding apparatus according to an embodiment of the present invention. The image coding apparatus includes an input unit 100, a luminance predictive coding unit 200, a chrominance predictive coding unit 300, a temporal predictive coding unit 400, a transformation/quantization unit 500, and an entropy coding unit 550.

An image coding method and apparatus according to the present invention will be described with reference to FIGS. 2A and 2B. When an image (for example, a motion image) to be coded is input to the input unit 100 in units of frames (S100), the input unit 100 determines whether the image is an intra-image or an inter-image and outputs the image to the temporal predictive coding unit 400 when the image is determined as the inter-image and to the luminance predictive coding unit 200 when the image is determined as the intra-image (S110).

The luminance predictive coding unit 200 codes a luminance component at each predetermined block in the intra-image (S200). Here, the luminance predictive coding unit 200 spatially predicts a pixel value of a luminance component in a current block to be coded using a pixel value in an adjacent block and generates a differential value between the predicted pixel value and a corresponding real pixel value of the luminance component in the current block.

The chrominance predictive coding unit 300 spatially predicts a pixel value of a chrominance component in the intra-image and generates a differential value between the predicted pixel value and a corresponding real pixel value of the chrominance component (S300). A function and operation of the chrominance predictive coding unit 300 will be described later in detail.

The temporal predictive coding unit 400 receiving the inter-image temporally predicts pixel values in the inter-image using an intra-image or an inter-image input in advance to the current inter-image, generates a differential value between each predicted pixel value and a corresponding real pixel value in the current inter-image, and outputs the differential value to the transformation/quantization unit 500 (S400).

The transformation/quantization unit 500 receives the spatially predicted differential values, i.e., the differential value of the luminance component and the differential value of the chrominance component, and the temporally predicted differential value, transforms the predicted differential values into values in frequency domain using a transformation method such as discrete cosine transformation (DCT), quantizes the predicted differential values in the frequency domain using predetermined quantization bits, and outputs the quantized predicted differential values to the entropy coding unit 550 (S500). The entropy coding unit 550 codes the quantized predicted differential values using entropy coding such as Huffman coding or arithmetic coding (S550).

After describing hybrid prediction used to perform predictive coding of a chrominance component according to the present invention with reference to FIGS. 5A through 5H, the chrominance predictive coding unit 300 and step S300 will be described in detail with reference to FIGS. 3A through 3D, which are schematic block diagrams of preferred embodiments of the chrominance predictive coding unit 300, and FIGS. 4A through 4D, which are flowcharts of preferred embodiments of the chrominance spatial prediction.

FIGS. 5A through 5H illustrate spatial prediction of a chrominance component according to the present invention. In FIGS. 5A through 5H, each of the squares and circles denotes a pixel. A circle-shape pixel denotes a pixel in a current block, and 8×8 circle-shape pixels constitute a single block. Pixel value prediction is performed in each 8×8 block. A square-shape pixel denotes a pixel in a block adjacent to the current block and is used to predict a pixel value in the current block. For clarity of the description, a pixel in an adjacent block above the current block is colored black, and a pixel in an adjacent block on the left of the current block is colored white. Values of eight black square-shape pixels above the current block change from left to right, and a variation of these values is denoted by dH. Values of eight white square-shape pixels on the left of the current block changes from top to bottom, and a variation of these values is denoted by dV. A change in a value in the current block can be predicted based on these variations dH and dV.

According to a plane prediction method suggested by the recommendation of a joint video team (JVT) committee, a predicted value has a plane shape gradually changing according to the variations dH and dV. However, in an actual image, a change in a value of a chrominance component is not great, and a change in the value is intermittent unlike in the plane prediction method in which a value changes gradually. While a value of luminance gradually changes according to intensity of illumination or an angle between an object and light, a value of chrominance changes intermittently because an object has a unique color.

In order to find a region having such an intermittent change in a current block, the block can be divided as shown in FIGS. 5A through 5H. Value of black circle-shape pixels are predicted using values of black square-shape pixels above the current block, and values of white circle-shape pixels are predicted using values of white square-shape pixels on the left of the current block.

A value of each hatched circle-shape pixel is predicted using a value of a black square-shape pixel, a value of a white square-shape pixel, or an average of the values of the black and white square-shape pixels. For example, in FIG. 5B, a value of a hatched circle-shape pixel above the line can be predicted using a value of a black square-shape pixel, and a value of a hatched circle-shape pixel below the line can be predicted using a value of a white square-shape pixel. Alternatively, a value of a hatched circle-shape pixel can be predicted using an average of values of a black square-shape pixel and a white square-shape pixel, respectively, which correspond a position of the hatched circle-shape pixel. In this situation, methods illustrated in FIGS. 5B and 5H have the same result, and methods illustrated in FIGS. 5D and 5F have the same result.

FIGS. 5A through 5H illustrate eight methods of dividing a block. Two schemes can be considered to determine which of the eight methods to use. In a first scheme, all of the eight methods are used, and then among the results of the eight methods, a method having the most optimal result is used. When the first scheme is used, a prediction error can be minimized. However, it is necessary to embed information indicating which method has been used during coding into a bitstream to be coded so that the method used during coding can be used during decoding. Since the information is coded, the amount of bits to be coded increases. Accordingly, a method that minimizes a prediction error and needs a small amount of bits when it is coded must be selected in order to achieve optimal compression efficiency.

In a second scheme, a particular one among the eight methods is determined using information which can be obtained during decoding, without coding information indicating a method used during coding. For example, since values of pixels in blocks adjacent to a current block, i.e., the values of the square-shape pixels, can be obtained during decoding, one among the eight methods can be selected using the values of the square-shape pixels. Specifically, the variations dH and dV can be used. When the variation dH is greater than the variation dV, the method illustrated in FIG. 5A, 5B, or 5H can be used. When the variation dV is greater than the variation dH, the method illustrated in FIG. 5D, 5E, or 5F can be used.

Figure 5A:
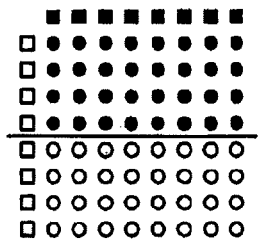
FIGS. 5A through 5H illustrate a method of dividing a block into two regions to perform predictive coding of a chrominance component according to the present invention.
Figure 5B:
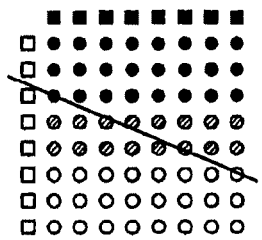
Figure 5C:
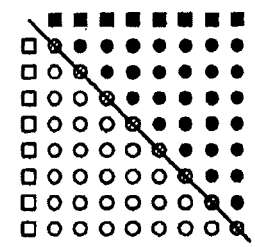
Figure 5D:
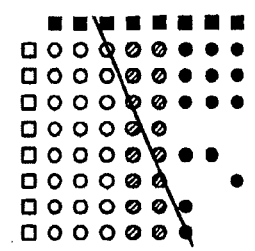
Figure 5E:
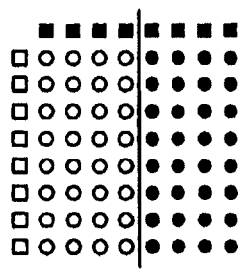
Figure 5F:
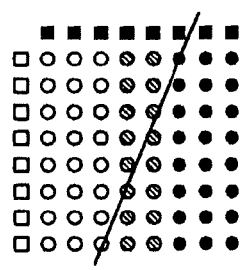
Figure 5G:
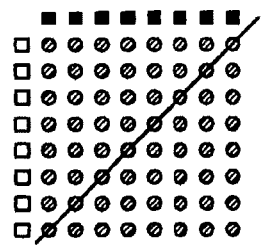
Figure 5H:
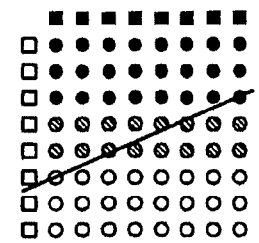

Information indicating a method selected among the three methods can be embedded into a bitstream to be coded, as in the first scheme. Alternatively, one among the three methods can be also selected using the values of the square-shape pixels. For example, a variation of values of the upper four pixels among the white square-shape pixels and a variation of values of the lower four pixels among the white square-shape pixels are obtained. When the upper variation is greater than the lower variation, the method illustrated in FIG. 5B is selected. When the lower variation is greater than the upper variation, the method illustrated in FIG. 5H is selected. When the upper and lower variations are almost the same, the method illustrated in FIG. 5A is selected. Similarly, a variation of values of the first four pixels among the black square-shape pixels and a variation of values of the last four pixels among the black square-shape pixels are obtained. When the variation of values of the first four pixels among the black square-shape pixels is less than the variation of values of the last four pixels among the black square-shape pixels, the method illustrated in FIG. 5D is selected. When the first variation is greater than the last variation, the method illustrated in FIG. 5F is selected. When the two variations is almost the same, the method illustrated in FIG. 5E is selected.

In addition, a difference between the vertical variation dV and the horizontal variation dH is compared with a threshold value. When the difference is not greater than the threshold value, one of the methods illustrated in FIGS. 5C and 5G is used for prediction. When a difference between an average of the values of the black square-shape pixels and an average of the values of the white square-shape pixels is great, the method illustrated in FIG. 5C is used. When the difference between the two averages is small, the method illustrated in FIG. 5G is used.

When all of the eight methods are used, a large amount of calculation is required. In order to decrease the amount of calculation, the number of methods used for prediction may be reduced. For example, only the method illustrated in FIG. 5C is used without obtaining the variations dH and dV. In another case, the method illustrated in FIG. 5A is used when the variation dH is greater than the variation dV, and the method illustrated in FIG. 5E is used when the variation dV is greater than the variation dH. In still another case, when an average of values of a black square-shape pixel and a white square-shape pixel is used as a value of a hatched circle-shape pixel, the methods illustrated in FIGS. 5B and 5H have the same result, and the methods illustrated in FIGS. 5D and 5F have the same result. Accordingly, when the method illustrated in FIG. 5G is excluded, a total of usable methods is reduced to five.

Conversely, when more directions of the line are added or another shape of the line dividing a block is considered, more methods can be defined. Even in this situation, which of the methods to use can be determined using the above-described two schemes.

When a value of a pixel in a current block is predicted using a value of a black or white square-shape pixel, it is simplest to use a value of a white or black square-shape pixel on the same column or row as the pixel in the current block. Alternatively, values of pixels on the left and the right of a white or black square-shape pixel on the same column or row as the pixel in the current block may be used. According to a direction of the line dividing the current block, a white or black square-shape pixel parallel to the line may be used. Pixels immediately adjacent to the current block and pixels adjacent to the pixels immediately adjacent to the current block may be used together.

Figure 3A:
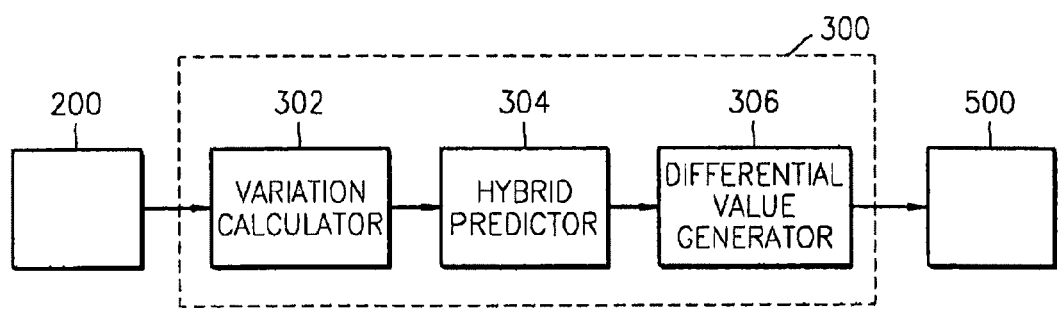
FIGS. 3A through 3D are schematic block diagrams of preferred embodiments of a chrominance predictive coding unit shown in FIG. 2A.
Figure 4A:
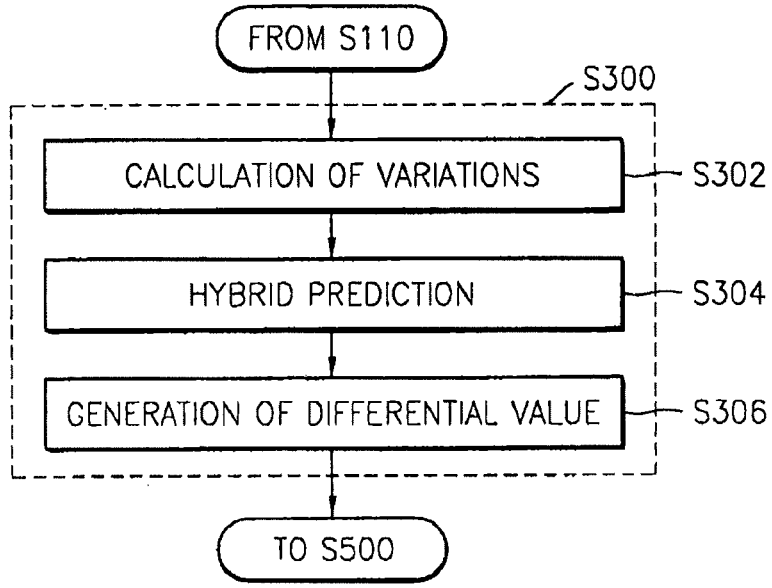
FIGS. 4A through 4D are flowcharts of preferred embodiments of spatial prediction of chrominance shown in FIG. 2B.

FIGS. 3A and 4A show the chrominance predictive coding unit 300 and the chrominance predictive coding (S300), respectively, according to a first embodiment of the present invention. The chrominance predictive coding unit 300 according to the first embodiment includes a variation calculator 302, a hybrid predictor 304, and a differential value generator 306.

When the chrominance component of the intra-image is input to the chrominance predictive coding unit 300, the variation calculator 302 calculates a horizontal variation and a vertical variation of pixel values in the current block using pixel values in reference blocks adjacent to the current block, as described above, and outputs the vertical and horizontal variations to the hybrid predictor 304 (S302).

The hybrid predictor 304 compares the horizontal variation and the vertical variation to determine a hybrid prediction method, generates a prediction value of each pixel in the current block according to the determined hybrid prediction method, and outputs the prediction value to the differential value generator 306 (S304).

More specifically, the hybrid predictor 304 determines whether a difference between the vertical variation and the horizontal variation is less than a predetermined threshold value. When the difference between the two variations is determined as being less than the predetermined threshold value, prediction is performed using the method illustrated in FIG. 5C or 5G according to the magnitude of an average pixel value, as described above. However, when the difference between the two variations is determined as not being less than the predetermined threshold value, one of the methods illustrated in FIGS. 5A, 5B, and 5H is used for prediction if the horizontal variation is greater than the vertical variation, and one of the methods illustrated in FIGS. 5D, 5E, and 5F is used for prediction if the vertical variation is greater than the horizontal variation, as described above. A scheme of selecting one among three methods has been described above.

The differential value generator 306 subtracts each prediction value from each corresponding real pixel value of the chrominance component in the intra-image to generate a differential value and outputs the differential value to the transformation/quantization unit 500 (S306).

Figure 3B:
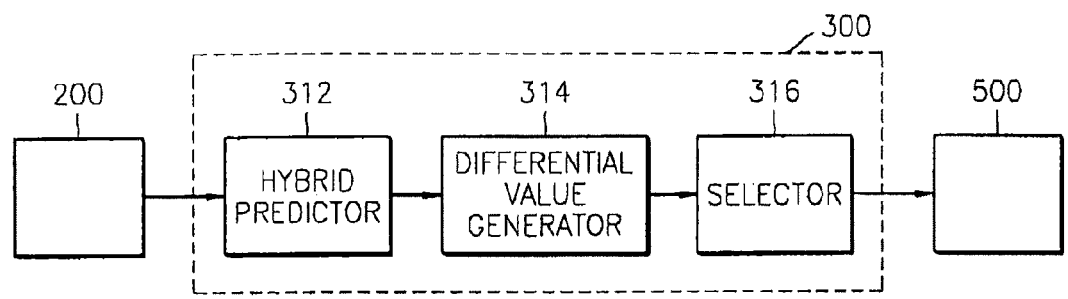
Figure 4B:
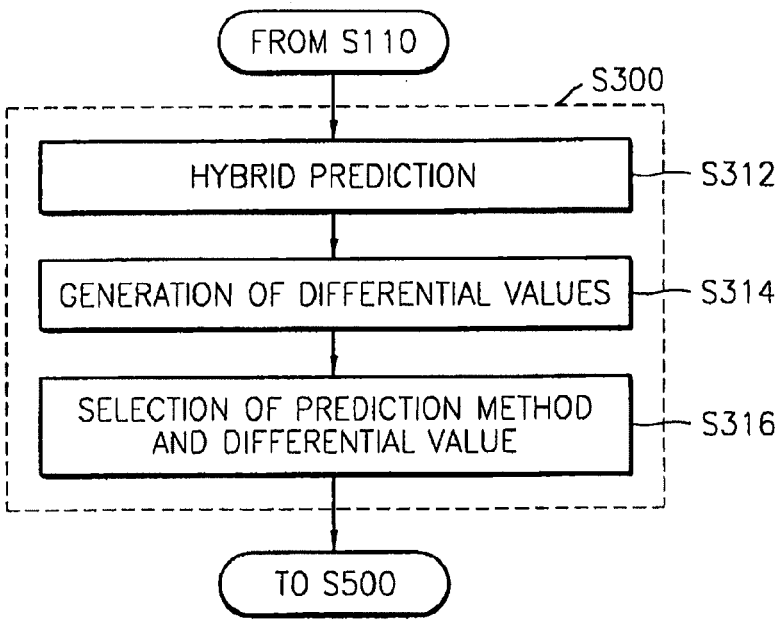

FIGS. 3B and 4B show the chrominance predictive coding unit 300 and the chrominance predictive coding (S300), respectively, according to a second embodiment of the present invention. The chrominance predictive coding unit 300 according to the second embodiment includes a hybrid predictor 312, a differential value generator 314, and a selector 316.

The hybrid predictor 312 generates prediction values of each pixel in an input block of the chrominance component by performing the eight methods illustrated in FIGS. 5A through 5H or a predetermined number of prediction methods and outputs the prediction values corresponding to the respective prediction methods to the differential value generator 314 (S312).

The differential value generator 314 subtracts each of the prediction values corresponding to the respective prediction methods from a corresponding real pixel value of the chrominance component in the intra-image to generate differential values corresponding to the respective prediction methods, and outputs the differential values to the selector 316 (S314).

The selector 316 selects a differential value having a least amount of data to be coded among the differential values and a prediction method corresponding to the selected differential value and outputs the selected differential value and prediction method to the transformation/quantization unit 500 (S316). The selector 316 can use various schemes to select a prediction method and a differential value. In the simplest schemes, a prediction method giving the least sum of absolute values of differential values for all pixels in a current block and a differential value corresponding to the prediction method are selected. The entropy coding unit 550 codes information on the selected prediction method together with quantized differential values and embeds the information into an output bitstream.

Figure 3C:
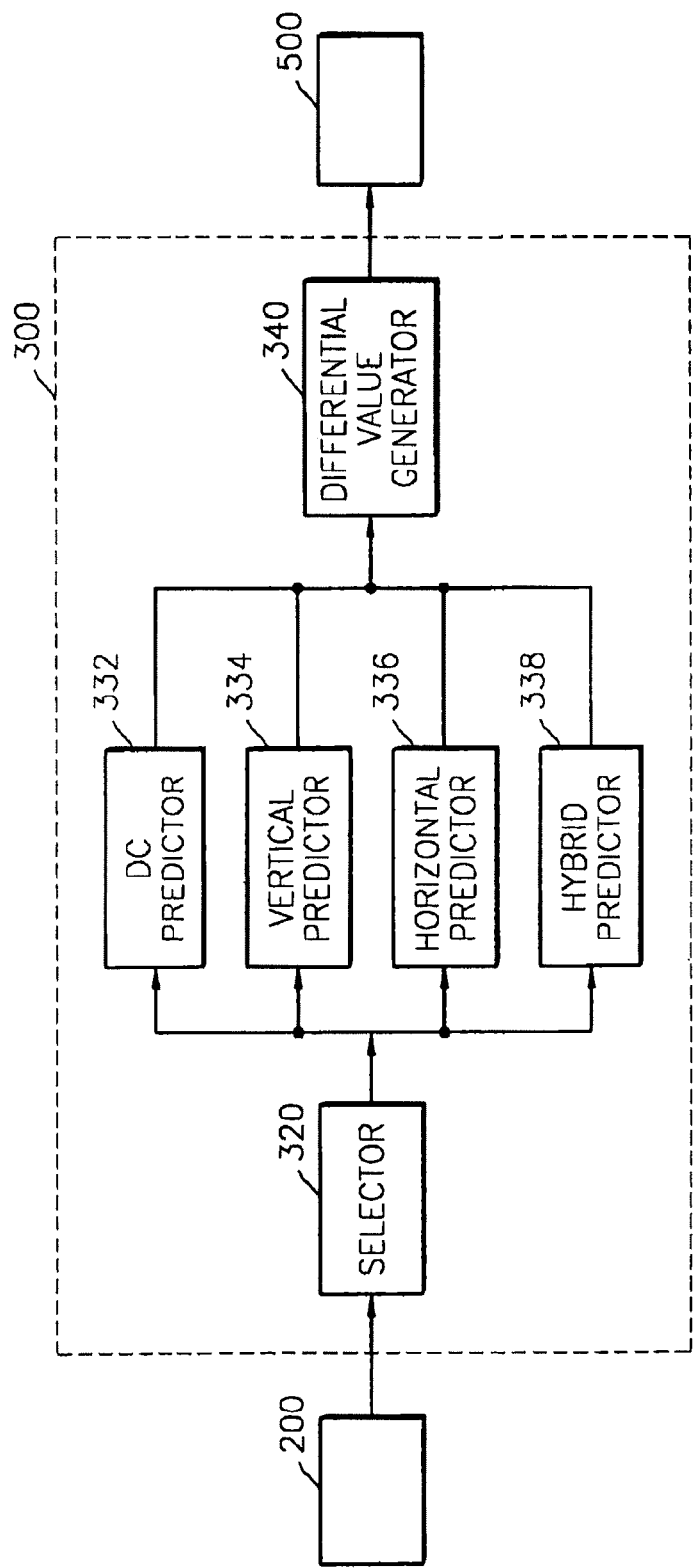
Figure 4C:
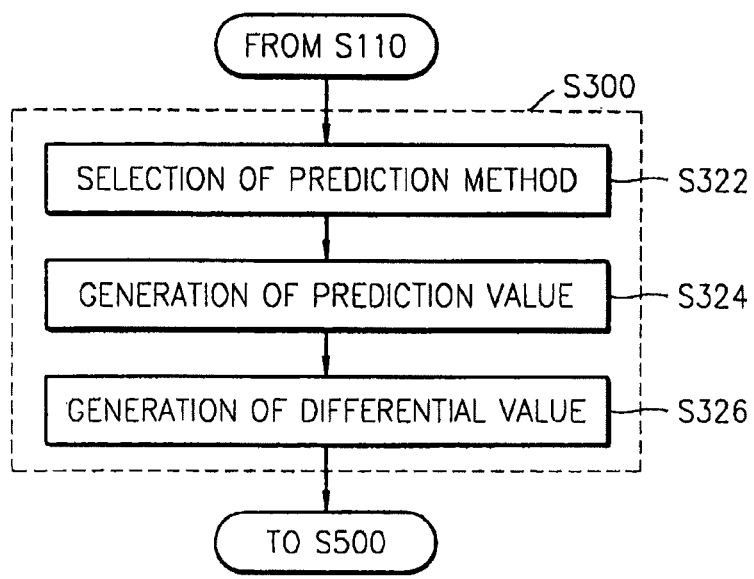

FIGS. 3C and 4C show the chrominance predictive coding unit 300 and the chrominance predictive coding (S300), respectively, according to a third embodiment of the present invention. The chrominance predictive coding unit 300 according to the third embodiment includes a selector 320, a direct current (DC) predictor 332, a vertical predictor 334, a horizontal predictor 336, a hybrid predictor 338, and a differential value generator 340. The hybrid predictor 338 is implemented by one of the hybrid predictors 304 and 312 shown in FIGS. 3A and 3B. The selector 320 receives the chrominance component of the intra-image, selects a spatial prediction method to be performed on the chrominance component among a DC prediction method, a vertical prediction method, a horizontal prediction method, and a hybrid prediction method, and outputs the chrominance component to a unit corresponding to the selected prediction method (S322). The selector 320 may select a prediction method simply according to a value previously set or currently input by a user or according to characteristics of an input image.

The DC predictor 332, the vertical predictor 334, the horizontal predictor 336, or the hybrid predictor 338 receiving the chrominance component from the selector 320 generates a prediction value of each pixel according to its prediction method and outputs the prediction value to the differential value generator 340 (S324). The differential value generator 340 subtracts the prediction value from a corresponding real pixel value of the chrominance component to generate a differential value and outputs the differential value and information on the prediction method to the transformation/quantization unit 500 (S326). The DC prediction method performed by the DC predictor 332, the vertical prediction method performed by the vertical predictor 334, and the horizontal prediction method performed by the horizontal predictor 336 have been described above. The hybrid prediction method performed by the hybrid predictor 338 has been also described above with reference to FIGS. 5A through 5H.

Accordingly, a bitstream generated according to the third embodiment includes coded differential values of the chrominance component and information on the selected prediction method. In addition, when the hybrid prediction method is selected and the hybrid predictor according to the second embodiment is used, information on a hybrid prediction method selected from a plurality of hybrid prediction methods is also included in the bitstream.

Figure 3D:
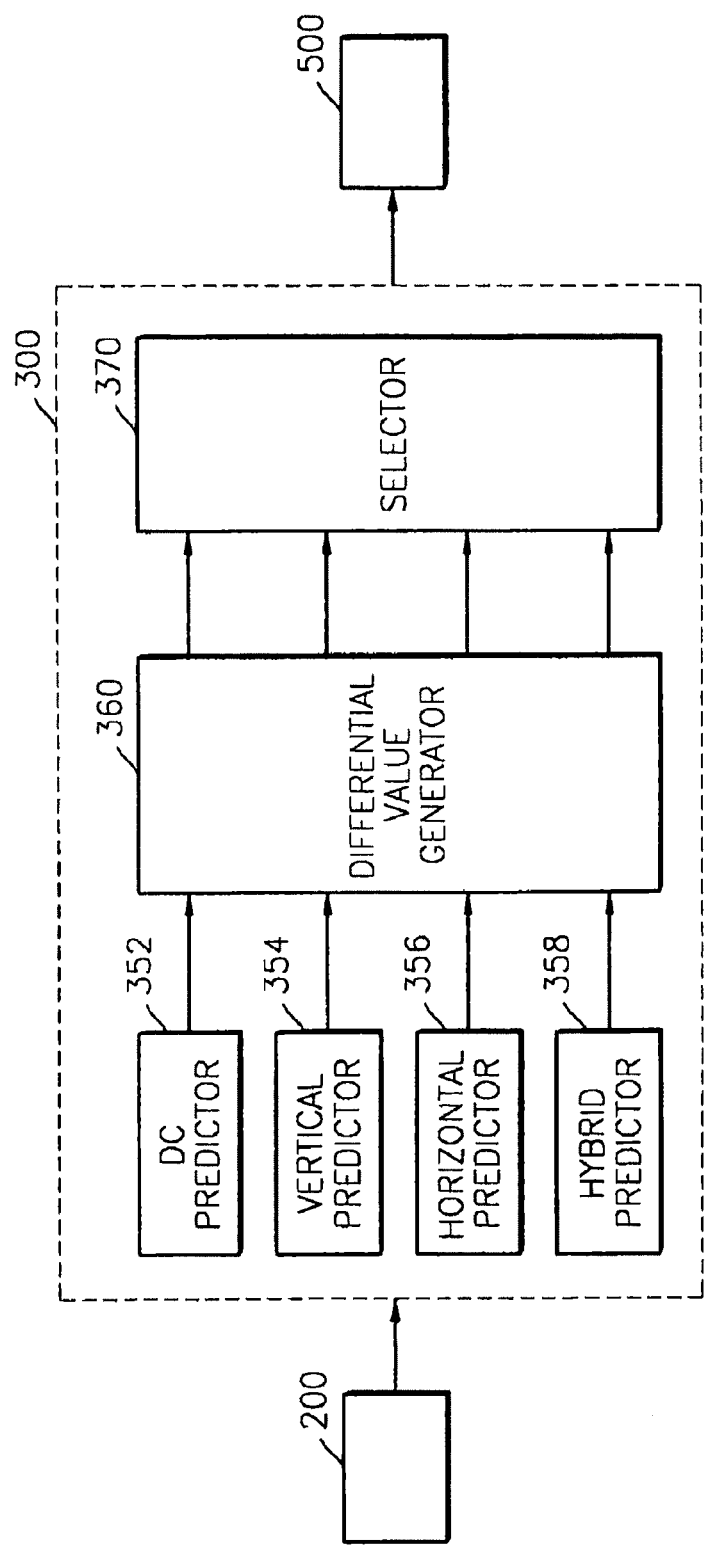
Figure 4D:
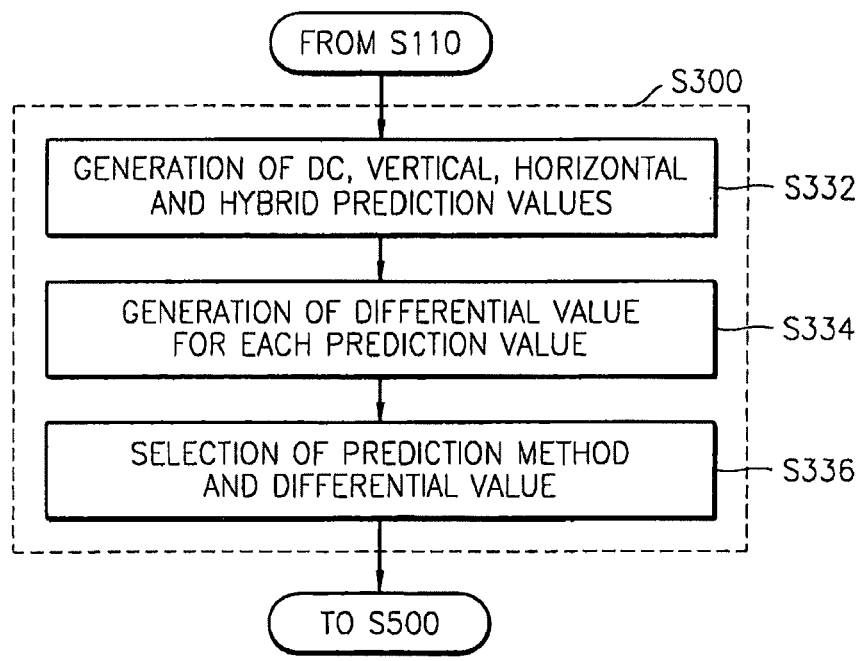

FIGS. 3D and 4D show the chrominance predictive coding unit 300 and the chrominance predictive coding (S300), respectively, according to a fourth embodiment of the present invention. The chrominance predictive coding unit 300 according to the fourth embodiment includes a DC predictor 352, a vertical predictor 354, a horizontal predictor 356, a hybrid predictor 358, a differential value generator 360, and a selector 370. The hybrid predictor 358 is implemented by one of the hybrid predictors 304 and 312 shown in FIGS. 3A and 3B. The chrominance component of the intra-image is input to all of the DC predictor 352, the vertical predictor 354, the horizontal predictor 356, and the hybrid predictor 358, each of which generates a prediction value of each pixel using its prediction method and outputs the prediction value to the differential value generator 360 (S332).

The differential value generator 360 subtracts the prediction value from each of the predictors 352, 354, 356, and 358 from a corresponding real pixel value of the chrominance component in the intra-image to generate differential values corresponding to the respective prediction methods and outputs the differential values to the selector 370 (S334). The selector 370 outputs a differential value having a least amount of data to be coded among the differential values and a prediction method corresponding to the selected differential value to the transformation/quantization unit 500 (S336). The selector 370 may use the selection scheme used by the selector 316 shown in FIG. 3B.

Accordingly, a bitstream generated according to the fourth embodiment includes coded differential values of the chrominance component and information on the selected prediction method. In addition, when the hybrid prediction method is selected and the hybrid predictor according to the second embodiment is used, information on a hybrid prediction method selected from a plurality of hybrid prediction methods is also included in the bitstream.

Image coding apparatuses and methods according to the first through fourth embodiments of the present invention have been described. Hereinafter, an apparatus and method for decoding images coded by the above coding methods will be described.

Figure 6A:
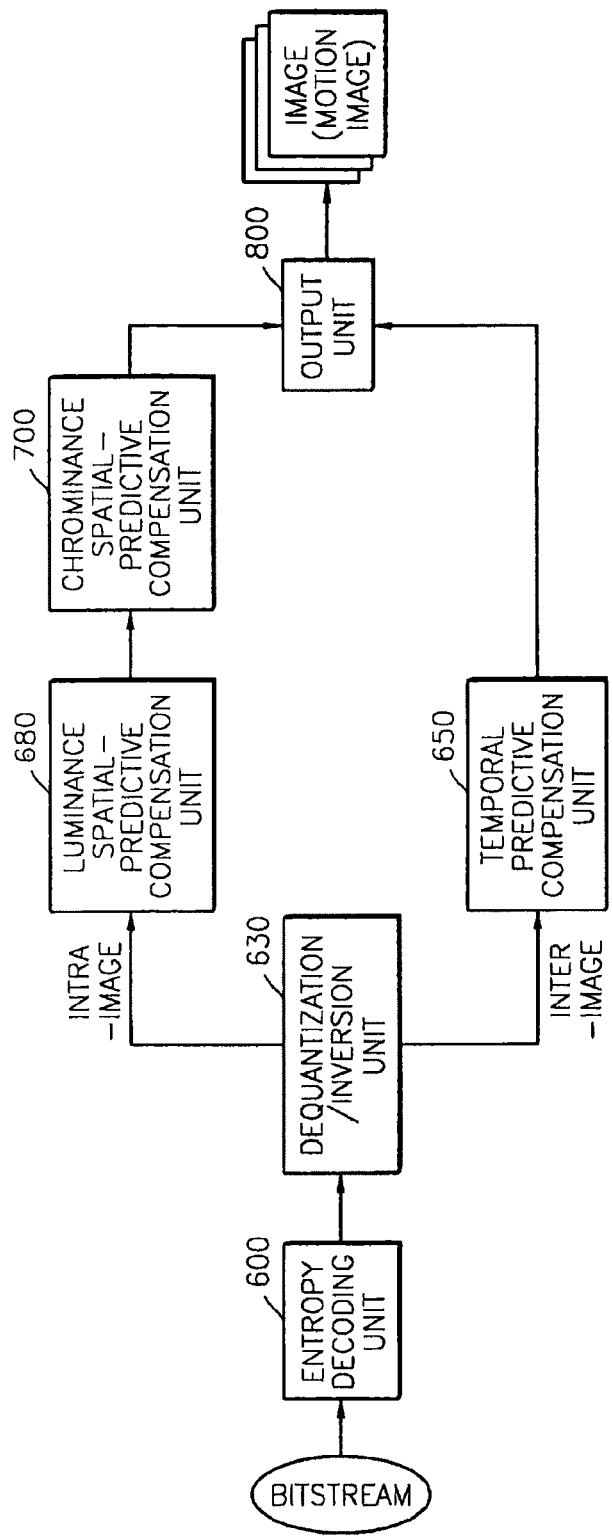
FIG. 6A is a block diagram of an image decoding apparatus according to an embodiment of the present invention.

FIG. 6A is a block diagram of an image decoding apparatus according to an embodiment of the present invention. The image decoding apparatus includes an entropy decoding unit 600, a dequantization/inversion unit 630, a temporal-predictive compensation unit 650, a luminance spatial-predictive compensation unit 680, a chrominance spatial-predictive compensation unit 700, and an output unit 800.

Figure 6B:
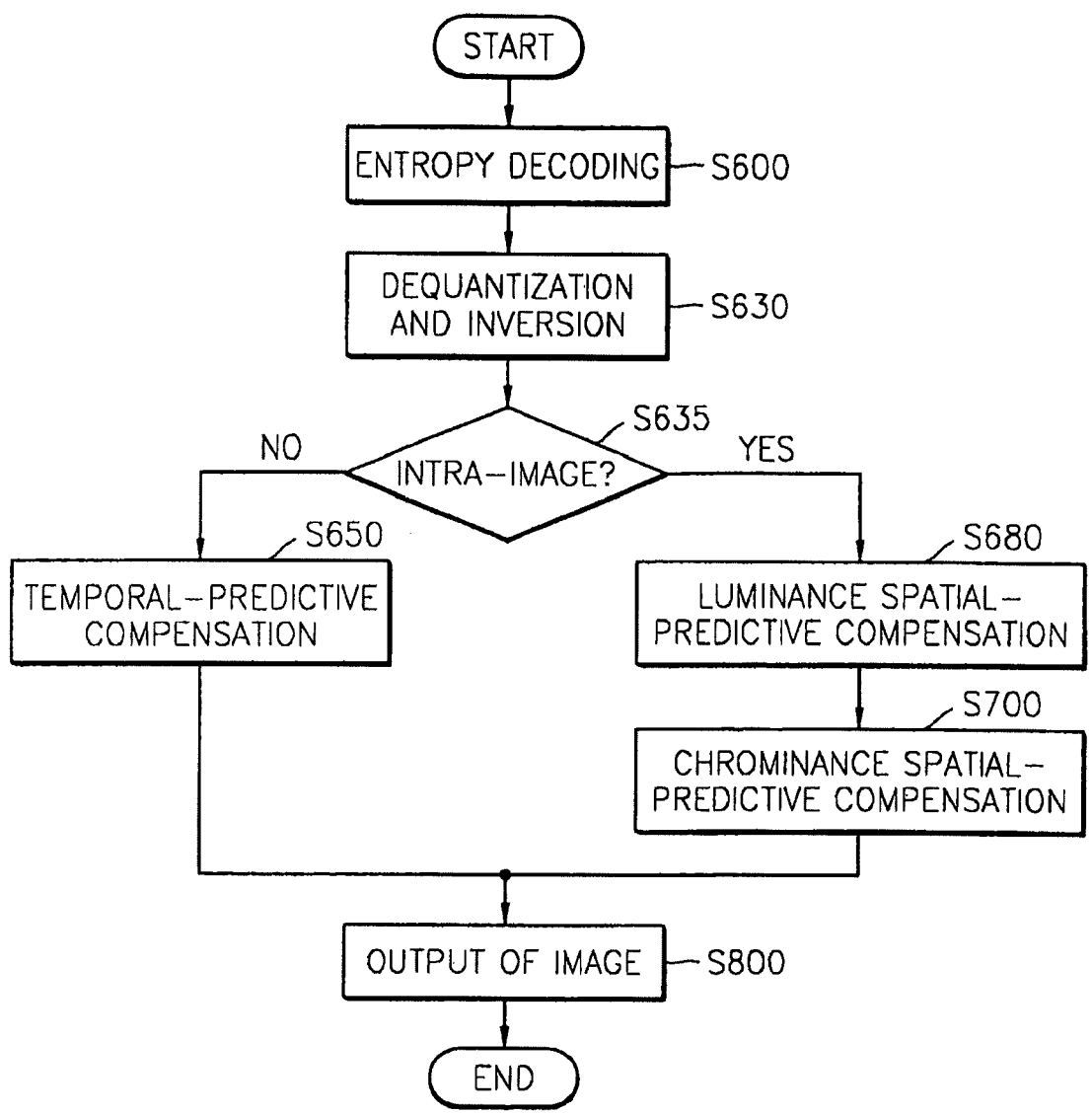
FIG. 6B is a flowchart of an image decoding method according to an embodiment of the present invention.

FIG. 6B is a flowchart of an image decoding method according to an embodiment of the present invention. Referring to FIGS. 6A and 6B, the entropy decoding unit 600 receives a bitstream obtained by coding an image, decodes the bitstream using an entropy decoding method corresponding to an entropy coding method used during the coding to generate quantized values, and outputs the quantized values to the dequantization/inversion unit 630 (S600).

The dequantization/inversion unit 630 dequantizes the quantized values from the entropy decoding unit 600 using a predetermined quantization bit number read from a header of the bitstream and inversely transforms values in frequency domain to values in time domain using an inversion method such as inverse DCT (IDCT) corresponding to frequency transformation used during the coding, thereby generating a differential value for each pixel in an image (S630). In addition, the dequantization/inversion unit 630 determines whether the generated differential values are for an intra-image and outputs the differential values to the luminance spatial-predictive compensation unit 680 when the differential values are determined as for the intra-image and to the temporal-predictive compensation unit 650 when the differential values are determined as for an inter-image (S635).

The temporal-predictive compensation unit 650 generates a prediction value for each pixel in a current image referring to a currently decoded intra-frame image and a previously decoded inter-frame image and adds each prediction value and a corresponding differential value received from the dequantization/inversion unit 630, thereby restoring the current image (S650).

Meanwhile, the luminance spatial-predictive compensation unit 680 receives the differential values for a luminance component of the intra-image, generates a prediction value for each pixel of the luminance component using a prediction method read from the bitstream, and adds each prediction value and a corresponding differential value received from the dequantization/inversion unit 630, thereby restoring the luminance component of the current image (S680).

The chrominance spatial-predictive compensation unit 700 receives differential values for a chrominance component of the intra-image, compensates for the differential values to restore the chrominance component, and outputs the restored chrominance component to the output unit 800 (S700).

The output unit 800 combines the restored luminance component and the restored chrominance component to output a restored image (S800).

Figure 7A:
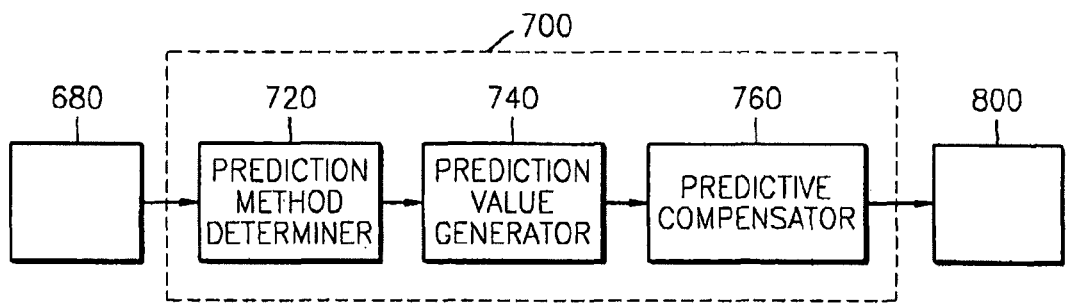
FIG. 7A is a block diagram of a chrominance spatial-predictive compensation unit according to an embodiment of the present invention.
Figure 7B:
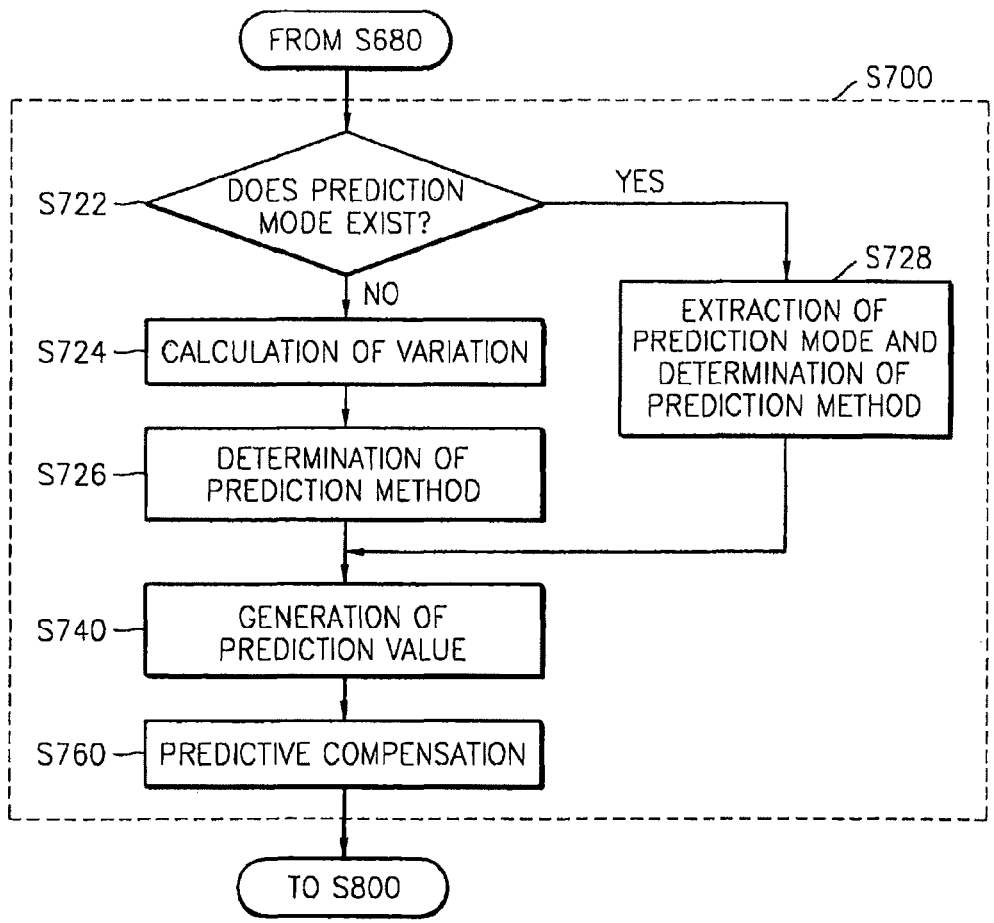
FIG. 7B is a flowchart of spatial-predictive compensation of chrominance according to an embodiment of the present invention.

FIG. 7A is a block diagram of the chrominance spatial-predictive compensation unit 700 according to an embodiment of the present invention. FIG. 7B is a flowchart of chrominance spatial-predictive compensation (S700) according to an embodiment of the present invention.

A prediction method determiner 720 receives the decoded differential values of the chrominance component and attempts to extract information (hereinafter, referred to as a "prediction mode") on the prediction method from the bitstream (S722).

When the chrominance component has been coded according to the image coding method and apparatus according to the first embodiment, the prediction mode does not exist. In this situation, the prediction method determiner 720 calculates a variation for the current block to be decoded, using pixel values in blocks which have been decoded prior to the current block and are located above and on the left of the current block (S724). Thereafter, the prediction method determiner 720 selects one among the prediction methods illustrated in FIGS. 5A through 5H or predetermined prediction methods according to the variation (S726).

When the prediction mode is included in the bitstream, the prediction method determiner 720 extracts and analyzes the prediction mode and determines the prediction method used during the coding (S728).

A prediction value generator 740 generates a prediction value of each pixel in the current block to be decoded, using previously decoded blocks according to the determined prediction method in the same manner as used to code the chrominance component, and outputs the prediction value to a predictive compensator 760 (S740). The prediction method used by the prediction value generator 740 is one among the DC prediction method, the vertical prediction method, the horizontal prediction method, or the hybrid prediction method.

The predictive compensator 760 adds the prediction value to a differential value of each corresponding pixel of the decoded chrominance component to restore the chrominance component of the intra-image (S760).

Figure 8A:
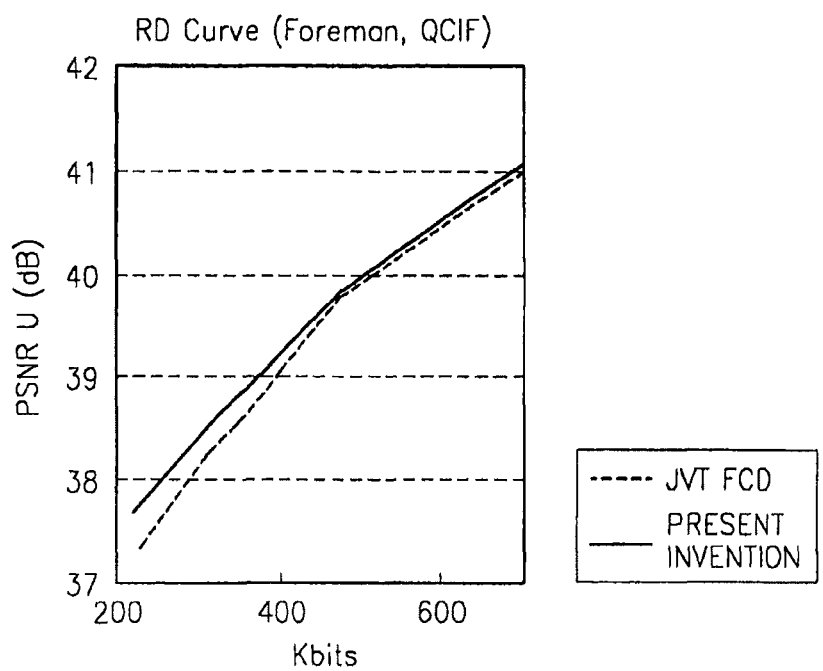
FIGS. 8A and 8B are graphs showing the test results of comparing a method of the present invention and a method suggested by the recommendation of the joint video team (JVT) committee in terms of compression efficiency.
Figure 8B:
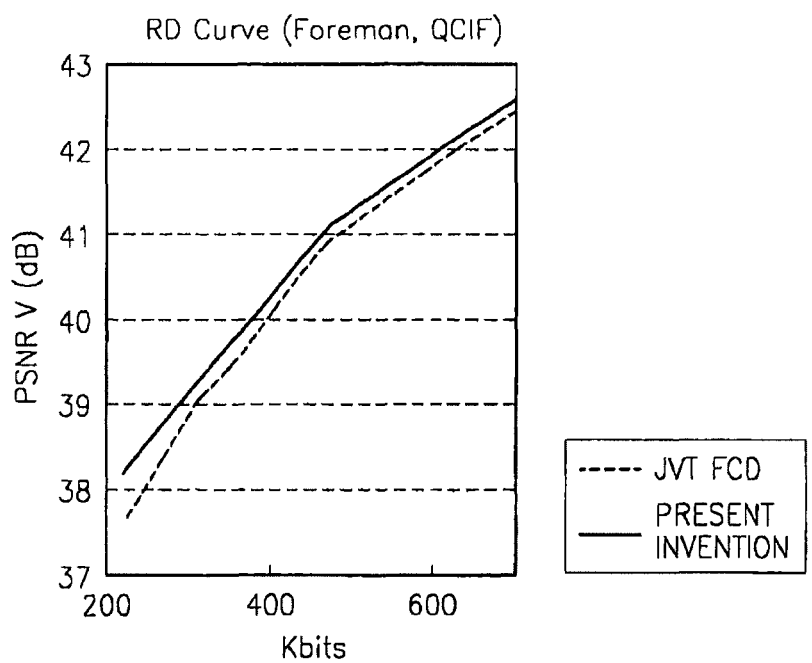

FIGS. 8A and 8B are graphs showing the test results of comparing a method of the present invention and a method suggested by the recommendation of the JVT committee. In the present invention, the variations dH and dV were compared with each other, only two methods illustrated in FIGS. 5A and 5E were used, and a prediction value of each pixel in a current block was generated using a value of a white or black square-shape pixel on the same column or row as the pixel in the current block. The prediction method according to the present invention was used instead of a plane prediction method among the methods suggested by the recommendation of the JVT committee. When the present invention is compared with the plane prediction method suggested by the recommendation of the JVT committee, the plane prediction method required 323 additions, 130 multiplications, and 67 shift operations per one block while the present invention required only one conditional operation. Accordingly, the present invention requires just a slight amount of calculation and shows better performance than the conventional technology by utilizing a statistical characteristic of a chrominance component, as shown in FIGS. 8A and 8B.

In the recommendation of the JVT committee, information indicating a chrominance prediction method used for each 8×8 block is coded using a variable-length code. In the present invention, a fixed-length code is used because the fixed-length code shows better compression performance than the variable-length code when a probability of each of the DC, vertical and horizontal prediction methods and the method of the present invention being selected is considered. Alternatively, a prediction method to be used for a current block is determined using information regarding adjacent reference blocks so that the prediction method can be used during decoding without coding the information indicating the prediction method used during coding. As described above, the present invention provides a simple and efficient prediction method when a chrominance component of an intra-image is spatially and predictively coded, by using a statistical characteristic of a chrominance component that color does not gradually change but intermittently changes in different regions.

The present invention can be realized as a code which is recorded on a computer readable recording medium and can be read by a computer. The computer readable recording medium may be any type of medium on which data which can be read by a computer system can be recorded, for example, a ROM, a RAM, a CD-ROM, a magnetic tape, a floppy disc, or an optical data storage device. The present invention can also be realized as carrier waves (for example, transmitted through Internet). Alternatively, computer readable recording media are distributed among computer systems connected through a network so that the present invention can be realized as a code which is stored in the recording media and can be read and executed in the computers.

As described above, according to the present invention, a chrominance component is effectively predictively coded so that compression efficiency is increased. In addition, since additions or multiplications are not required, the amount of calculation is reduced. Accordingly, time required for coding and decoding is reduced.

In the drawings and specification, preferred embodiments of the invention have been described using specific terms but it is to be understood that such terms have been used only in a descriptive sense and such descriptive terms should not be construed as placing any limitation on the scope of the invention. Accordingly, it will be apparent to those of ordinary skill in the art that various changes can be made to the embodiments without departing from the scope and spirit of the invention. Therefore, the scope of the invention is defined by the appended claims.

What is claimed is:

1. An apparatus for processing a color component in a video, the apparatus comprising:
a processor configured to:
obtain a residual value of the color component from a decoded bitstream;
check information related to intra prediction from the decoded bitstream, for a current prediction block of the color component;
generate a prediction value for the current prediction block, by performing the intra prediction on the current prediction block in response to checking of the information related to the intra prediction from the decoded stream; and
reconstruct the current prediction block by using the prediction value and the residual value,
wherein the processor is configured to generate the prediction value for the current prediction block, by performing the intra prediction either based on an intra prediction mode determined from a neighboring block of the current prediction block or based on an intra prediction mode from among a plurality of intra prediction modes as indicated by the information related to the intra prediction from the decoded stream, and
wherein the neighboring block is located on at least one of a left side of the current prediction block and an upper side of the current prediction block.

2. The apparatus of claim 1, wherein the current prediction block is formed by at least horizontally splitting a coding unit.

3. The apparatus of claim 1, wherein the current prediction block is formed by at least vertically splitting a coding unit.

4. The apparatus of claim 1, wherein the plurality of intra prediction modes include a DC prediction mode, a prediction mode associated with a particular direction, and a prediction mode determined by horizontal and vertical variations for the current prediction block.

* * * * *